United States Patent
Osmundsen et al.

(10) Patent No.: US 9,547,294 B2
(45) Date of Patent: Jan. 17, 2017

(54) SYSTEM AND METHOD FOR CONTROLLING AND DIAGNOSING A COMBINED CYCLE POWER PLANT

(75) Inventors: Mark Robert Osmundsen, Greenville, SC (US); William Forrester Seely, Taylors, SC (US); John Edward Sholes, Kings Mountain, NC (US); Steven William Tillery, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 13/475,201

(22) Filed: May 18, 2012

(65) Prior Publication Data

US 2013/0311139 A1  Nov. 21, 2013

(51) Int. Cl.
*G05B 17/02* (2006.01)

(52) U.S. Cl.
CPC ............... *G05B 17/02* (2013.01); *Y02E 20/16* (2013.01)

(58) Field of Classification Search
CPC ............ G06F 11/3447; G06F 11/3452; G06F 11/3457; G06F 11/3466; G05B 29/04; G05B 19/0405; G05B 23/0294; G05B 13/021; G05B 13/024; G05B 2219/14063
USPC ................................................ 702/182, 183
See application file for complete search history.

(56) References Cited

U.S. PATENT DOCUMENTS

| | | | |
|---|---|---|---|
| 4,222,229 A | 9/1980 | Uram | |
| 6,591,225 B1 * | 7/2003 | Adelman et al. | 702/182 |
| 6,785,633 B2 * | 8/2004 | Patanian et al. | 702/182 |
| 7,058,552 B2 | 6/2006 | Stothert et al. | |
| 7,826,990 B2 * | 11/2010 | Nasle et al. | 702/85 |
| 2007/0055392 A1 * | 3/2007 | D'Amato et al. | 700/44 |
| 2007/0168174 A1 * | 7/2007 | Davari et al. | 703/18 |
| 2008/0027616 A1 * | 1/2008 | Zhang et al. | 701/99 |

* cited by examiner

*Primary Examiner* — Mohamed Charioui
*Assistant Examiner* — Catherine Rastovski
(74) *Attorney, Agent, or Firm* — Fletcher Yoder, P.C.

(57) ABSTRACT

A system and method in a combined cycle power plant includes a processor modeling plant level performance by considering the interrelation between outputs of the gas turbine and the steam turbine. The model can be computational, predictive, or both. The model may be used to control subsystems of the plant (including the gas turbine and the steam turbine) to achieve a target plant performance. The model may also be used to diagnose or maintain subsystems of the combined cycle power plant.

19 Claims, 3 Drawing Sheets

1

SYSTEM AND METHOD FOR CONTROLLING AND DIAGNOSING A COMBINED CYCLE POWER PLANT

BACKGROUND OF THE INVENTION

The subject matter disclosed herein relates to the control, diagnosis, and maintenance of performance in a combined cycle power plant.

BACKGROUND OF THE INVENTION

A combined cycle power plant uses both gas and steam turbines to generate the total plant power output. The gas turbine may be considered the primary power source. Exhaust (waste heat) from the gas turbine is used to generate steam that powers the steam turbine, which generates additional power as a secondary source. Existing systems control operation of the gas turbine, the steam turbine, or other plant subsystems to affect plant performance without considering the interrelationship between the gas turbine and the steam turbine. Further, existing systems do not consider the interrelationship between the gas turbine and the steam turbine or the overall plant operations in assessing problems or in maintaining subsystems.

BRIEF DESCRIPTION OF THE INVENTION

According to one aspect of the invention, a system in a combined cycle plant includes a measurement device configured to measure one or more parameters of plant subsystems, the plant subsystems including a gas turbine and a steam turbine; and a model processor configured to execute a model of plant performance based on the one or more measured parameters, the model processor considering an interconnection between outputs of the gas turbine and the steam turbine of the combined cycle plant.

According to another aspect of the invention, a method of controlling performance of a combined cycle power plant includes measuring one or more parameters of plant subsystems, the plant subsystems including a gas turbine and a steam turbine; modeling plant performance based on the one or more measured parameters, the modeling being based on an interconnection between outputs of the gas turbine and the steam turbine of the combined cycle power plant; determining target plant performance; and controlling one or more of the plant subsystems based on the modeled plant performance to achieve the target plant performance.

According to yet another aspect of the invention, a method of diagnosing subsystems of a combined cycle power plant includes measuring one or more parameters of plant subsystems, the plant subsystems including a gas turbine and a steam turbine; modeling plant performance based on the one or more measured parameters, the modeling being based on an interconnection between outputs of the gas turbine and the steam turbine of the combined cycle power plant; comparing at least one of the one or more parameters to the modeled plant performance to diagnose one or more of the plant subsystems.

These and other advantages and features will become more apparent from the following description taken in conjunction with the drawings.

BRIEF DESCRIPTION OF THE DRAWING

Referring now to the drawings wherein like elements are numbered alike in the several Figures.

DETAILED DESCRIPTION OF THE INVENTION

Figure 1:
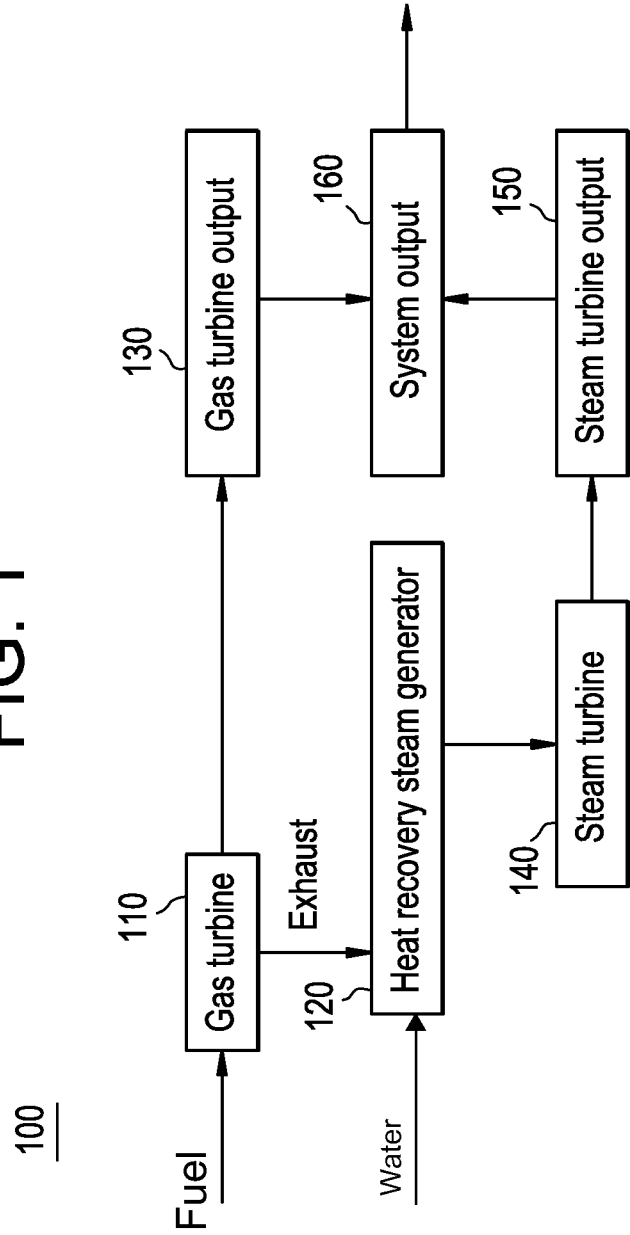
FIG. 1 is block diagram of a combined cycle power plant.

FIG. 1 is a block diagram of a combined cycle power plant 100. The combined cycle power plant 100 includes a gas turbine 110 as a primary power generator with a gas turbine output 130. The combined cycle power plant 100 also includes a steam turbine 140, which uses steam generated by a heat recovery steam generator (HRSG) 120 from the exhaust (waste) heat of the gas turbine 110, as a secondary power generator with steam turbine output 150. Thus, the ultimate system output 160 of the combined cycle power plant 100 includes both the gas turbine output 130 and the steam turbine output 150.

As opposed to simply being two independent sources of the system output 160, the gas turbine 110 and the steam turbine 140 are interrelated. That is, any change in the operation of the gas turbine 110 has both a direct (on the gas turbine output 130) and indirect (through an effect on the steam turbine output 150) effect on the system output 160. The indirect effect results from the fact that the gas turbine 110 operation drives the steam turbine 140 operation. For example, when the gas turbine output 130 increases, the resulting exhaust increases, which allows the HRSG 120 to produce more steam to drive the steam turbine 140. As a result, any control system that treats the gas turbine 110 and the steam turbine 140 as two independent sources of the system output 160 and controls the gas turbine output 130, for example, to obtain a target system output 160 is likely to be sub-optimal (controlling plant systems in an undesirable way or requiring more hardware to attain the target system output 160).

Figure 2:
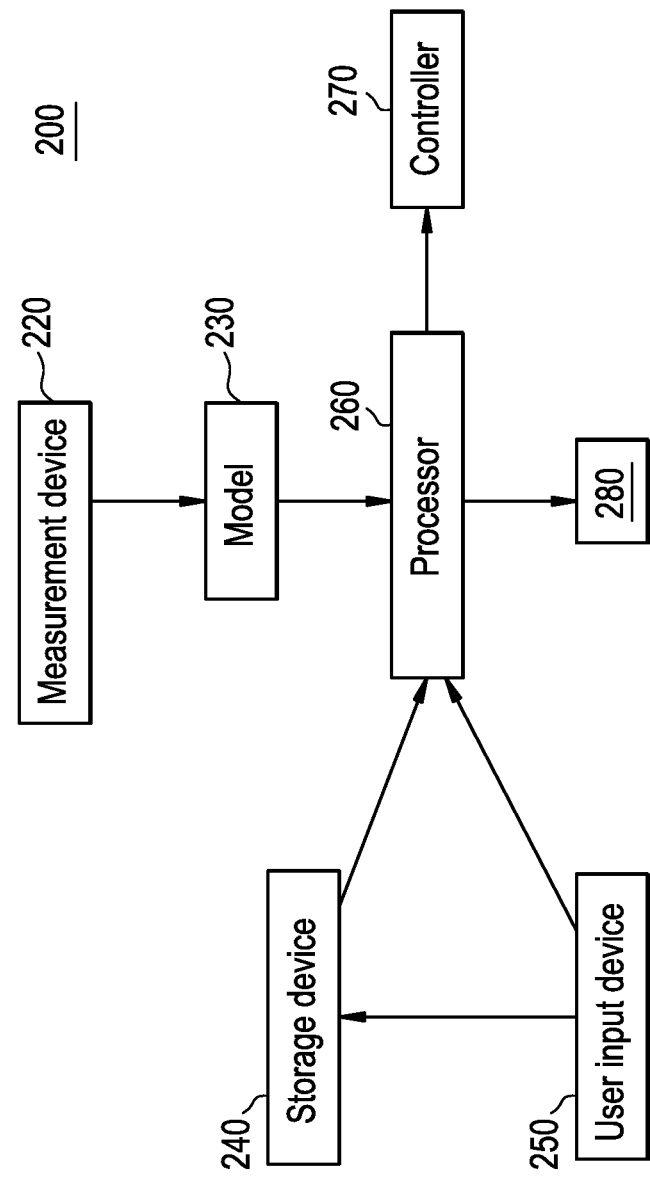
FIG. 2 is a block diagram of a combined cycle plant control, diagnosis, and maintenance system according to several embodiments of the invention.

FIG. 2 is a block diagram of a combined cycle plant control, diagnosis, and maintenance system 200 according to several embodiments of the invention. The system 200 can include a measurement device 220, a model 230, a storage device 240, a user input device 250, a processor 260, a controller 270, and an output device 280. The output device 280 may be a display device to display the output to a user, a memory to store the output, or both. One will readily understand that, although one exemplary measurement device 220 and model 230 are shown, the invention contemplates any number of measurement devices 220 and models 230 that are separate, integrated, or in communication with each other. The measurement device 220 may measure exhaust temperature of the gas turbine, and parameters related to the steam turbine, such as its output. Other contemplated measurements involving the gas turbine include inlet guide vane angle, inlet bleed heat flow, generated power, combustion mode, emissions, combustor firing temperature, compressor pressure ratio, and vibrations. Other contemplated measurements involving the steam turbine include steam temperature, steam pressure, steam flow, rotor stress and eccentricity, case temperature, and vibrations.

The model 230 may be a computational (physics-based) model that computes performance parameters based on measurements from the measurement device 220. In an alternate embodiment, the model 230 may be a predictive model that learns and refines the relationship between measurements taken by the measurement device 220 and performance results over time. A predictive model 230 may be developed within a neural network, for example. The model 230 may also be a combination of computational and predictive elements. The model 230 may include one or more memory devices and one or more processors to execute modeling processes. The model 230 may use measurements from the measurement device 220 to model plant-level thermodynamics and performance, as well as detailed subsystem performance. The model 230 may be calibrated automatically or manually on a regular or event-based basis to ensure reliability of the modeled output. The calibration of the model 230 may account for the current phase of the lifecycle of the plant and its various subsystems. A significant commonality of the embodiments of the model 230 discussed above is the fact that any model 230 (e.g. computational, predictive, etc.) must consider the interrelationship between the gas turbine 110 and the steam turbine 140 discussed with reference to FIG. 1.

The processor 260 can use the modeled performance output from the model 230 in a number of different embodiments, detailed below. The processor 260 is not limited to a single processor but may be comprised of a plurality of processors that are housed together or separately and are in communication with each other. Additionally, the processor 260 may incorporate or be in communication with a controller 270 or an output device 280.

In one embodiment, the processor 260 uses the modeled output from the model 230 along with target performance parameters to control the gas turbine 110, the steam turbine 140, or other plant subsystems so that the gas turbine output 130 and the steam turbine output 150 result in the target system output 160. The target performance parameters may be predetermined and stored in the storage device 240. In an alternative embodiment, the target performance parameters may be input by a user through the user input device 250. The processor 260 communicates with the controller 270 to implement control on the plant subsystems (including the gas turbine 110 and the steam turbine 140).

The consideration of interrelationships within the model 230 allows a more optimal solution. For example, because any change in the steam turbine output 150, resulting from a change in control of the gas turbine 110, is also considered by both the model 230 and the processor 260, the control of the gas turbine 110 by the controller 270 results in a gas turbine output 130 and steam turbine output 150 that, together, achieve the target system output 160.

In another embodiment, the processor 260 diagnoses potential problems in plant subsystems based on the model 230 output. For example, for a given gas turbine output 130, the model 230 may compute or predict a given steam turbine output 150 based on measurements by the measurement device 220 of parameters related to gas turbine 110 exhaust. If the actual steam turbine output 150, based on the measurement device 220, is outside a range of acceptable performance based on the expected steam turbine output 150 of the model 230, then the processor 260 can output an alert to the output device 280. Additionally, the processor 260 may cause the controller 270 to control plant subsystems and outputs (including the gas turbine output 130) to compensate for the unexpected measured steam turbine output 150. The range of acceptable performance may be predetermined (e.g., established by the model 230 over time) and stored in the storage device 240 or may be user-specified at the user input 250.

In yet another embodiment, the processor 260 is part of the life cycle maintenance of the plant subsystems. That is, in addition to diagnosing a potential problem with the current state of the system, the processor 260 may determine a decline in the functionality of a subsystem and display an alert at the display device 280 advising maintenance or replacement of the subsystem. The basis for such a maintenance alert may be a different (narrower) range of acceptable subsystem performance than the range used to diagnose a problem (discussed above with regard to the diagnostic embodiment). The range of acceptable values for maintenance purposes, like the range of acceptable values for diagnostic purposes, may be stored in the storage device 240 or may be input at the user input 250. The maintenance alert may be generated based on multiple outputs of the measurement device 220 that indicate an increasing divergence from subsystem performance values expected based on the model 230.

Figure 3:
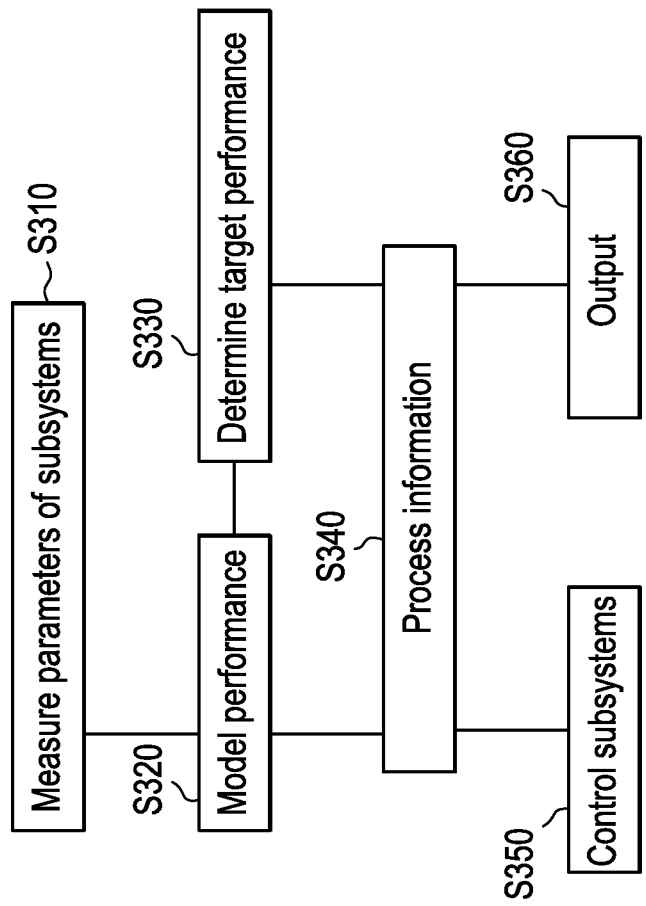
FIG. 3 illustrates the processes included in controlling, diagnosing, and maintaining a combined cycle plant according to several embodiments of the invention.

FIG. 3 illustrates the processes included in controlling, diagnosing, and maintaining a combined cycle plant according to several embodiments of the invention. The processes include measuring parameters at S310, modeling performance at S320, determining target performance at S330, processing information at S340, controlling plant subsystems at S350, and outputting at S360.

In one embodiment, the processes are executed to control the gas turbine 110, the steam turbine 140, or other plant subsystems to achieve a target performance for the combined cycle plant 100. Parameters of various plant subsystems are measured at the measuring parameters block at S310. Based on the measured parameters and also based on the interrelationship between the steam turbine 140 and the gas turbine 110, performance of the plant is modeled at the modeling performance block S320. The modeling at block S320 may include computational modeling, predictive modeling, or a combination of the two. At S330, determining target performance includes receiving user input or reading out predetermined and stored target performance values from a storage device 240. Processing information at block S340 includes considering the output of the modeling at S320 and the determining target performance at block S330 together to determine how the plant subsystems should be controlled at block S350 in order to achieve the target performance.

In another embodiment, the processes are executed to diagnose a potential issue with a subsystem of the combined cycle plant 100. Measuring parameters at block S310 and modeling performance at block S320 are performed as discussed for the previous embodiment. At S340, diagnosing a potential issue includes comparing the modeled performance (at S320) based on the obtained measurements (at S310) with a range of acceptable values. A subsystem that falls outside the range is reported at the display block S360. In addition to displaying an alert at the outputting block S360, the processing at S340 may lead to controlling the gas turbine 110, the steam turbine 140, or other plant subsystems at S350 to mitigate the potential issue indicated by the processing at S340.

In yet another embodiment, the processes are executed to maintain the subsystems of the combined cycle plant 100. Based on the measuring at S310 and the modeling at block S320, the processing at S340 may indicate, at the outputting block S360, whether a subsystem may require maintenance. The processing at S340 includes comparing the modeled performance (at S320) based on the obtained measurements (at S310) with a range of values that may be narrower than the range of acceptable values discussed with regard to diagnosis. The processing at S340 may indicate that, while the modeled performance (at S320) is within an acceptable range, one or more subsystems is operating outside the expected range of operation. In addition to displaying an alert at the outputting block S360, the processing at S340 may lead to controlling the gas turbine 110, the steam turbine, or other plant subsystems at S350 to mitigate the maintenance issue indicated by the processing at S340.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components and technologies may provide certain necessary or beneficial functionality or features. Accordingly, these functions and features as may be needed in support of the appended claims and variations therefore, are recognized as being inherently included as a part of the teachings herein and a part of the invention disclosed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system in a combined cycle power plant, the system comprising:
   a measurement device configured to measure one or more parameters of plant subsystems, the plant subsystems including a gas turbine and a steam turbine, wherein the one or more parameters comprise a gas turbine inlet guide van angle, a steam turbine rotor stress, a steam turbine eccentricity, and a steam turbine case temperature;
   a model processor comprising a physics-based model configured to provide a model output of plant performance based on the one or more parameters, the model processor considering an interconnection between outputs of the gas turbine and the steam turbine of the combined cycle power plant;
   a user input device configured to receive a desired steam turbine steam pressure from a user;
   a target performance determination unit configured to determine a target plant performance based at least on the desired steam turbine steam pressure; and
   a controller configured to control operation of the gas turbine based on the model output to achieve the target plant performance.

2. The system according to claim 1, further comprising:
   a processor configured to diagnose one or more of the plant subsystems based on the model output.

3. The system according to claim 2, wherein the processor diagnoses the one or more plant subsystems based on a comparison of the model output with a range of acceptable values.

4. The system according to claim 3, wherein
   the processor diagnoses a malfunction of the one or more subsystems based on a first range of acceptable values, and
   the processor diagnoses a maintenance state for the one or more subsystems based on a second range of acceptable values.

5. The system according to claim 4, wherein a user determines the first range of acceptable values and the second range of acceptable values.

6. The system according to claim 4, wherein the first range of acceptable values and the second range of acceptable values are predetermined.

7. The system according to claim 4, wherein an output device displays an alert when the processor diagnoses the malfunction or the maintenance state.

8. The system according to claim 1, wherein the model processor executes a computational model.

9. The system according to claim 1, wherein the model processor executes a predictive model.

10. The system according to claim 1, wherein the target performance determination unit is a storage device that stores predetermined values of target plant performance.

11. The system according to claim 1, wherein the target performance determination unit includes the user input device.

12. A method of diagnosing subsystems of a combined cycle power plant, the method comprising:
    measuring one or more parameters of plant subsystems, the plant subsystem including a gas turbine and a steam turbine, wherein the one or more parameters comprise a gas turbine inlet guide van angle, a steam turbine rotor stress, a steam turbine eccentricity, and a steam turbine case temperature;
    modeling plant performance via a physics-based model based on the one or more parameters, the modeling being based on an interconnection between outputs of the gas turbine and the steam turbine of the combined cycle power plant;
    receiving a user input comprising a desired steam turbine steam pressure from a user;
    determining target plant performance based at least on the desired steam turbine steam pressure;
    diagnosing a malfunction of one or more of the plant subsystems based on the modeled plant performance; and
    controlling the one or more of the plant subsystems based on the diagnosing and on the target plant performance.

13. The method according to claim 12, wherein the diagnosing includes comparing the modeled plant performance with a range of acceptable values.

14. The method according to claim 13, further comprising:
    diagnosing the malfunction of the one or more of the plant subsystems based on a first range of acceptable values; and
    diagnosing a maintenance state for the one or more plant subsystems based on a second range of acceptable values.

15. The method according to claim 14, further comprising:
    accepting a user input of the first range of acceptable values and the second range of acceptable values.

16. The method according to claim 14, further comprising:
   obtaining the first range of acceptable values and the second range of acceptable values from a storage device.

17. A method of controlling performance of a combined cycle power plant, the method comprising:
   measuring one or more parameters of plant subsystems, the plant subsystems including a gas turbine and a steam turbine, wherein the one or more parameters comprise a gas turbine inlet guide van angle, a steam turbine rotor stress, a steam turbine eccentricity, and a steam turbine case temperature;
   modeling plant performance via a physics-based model based on the one or more parameters, the modeling being based on an interconnection between outputs of the gas turbine and the steam turbine of the combined cycle power plant;
   receiving a user input comprising a desired steam turbine steam pressure from a user;
   determining target plant performance based at least on the desired steam turbine steam pressure; and
   controlling the gas turbine based on the modeled plant performance to achieve the target plant performance.

18. The method according to claim 17, wherein the determining target plant performance includes accessing stored plant performance values in a storage device.

19. The method according to claim 17, wherein the determining target plant performance includes receiving a user input.

* * * * *